United States Patent Office 2,978,438
Patented Apr. 4, 1961

2,978,438

CONTINUOUS PRODUCTION OF POLYAMIDES

Heinz Indest, Erlenbach (Main), Johannes Kleine, Munich, and Helmut Stöhr, Obernburg (Main), Germany, assignors to Vereinigte Glanzstoff-Fabriken A.G., Wuppertal-Elberfeld, Germany No Drawing. Filed Nov. 13, 1956, Ser. No. 621,501

Claims priority, application Germany Dec. 20, 1955

6 Claims. (Cl. 260—78)

The invention relates to processes for the continuous production of polyamides from dicarboxylic acids and diamines.

It is a familiar practice to produce polyamides from aqueous solutions of salts from dicarboxylic acids and diamines by batch processes with the application of pressure. The application of pressure is necessary because, otherwise, the volatile diamine components are readily removed from the reaction chamber with steam and would disturb the course of the reaction considerably. Furthermore, the application of pressure prevents the salts formed from the starting products from falling out. The salts separated in the reaction tube would considerably disturb the heat transfer and, thereby, in turn, the course of the reaction. Further, it was proposed in a continuous process that the condensation of dicarboxylic acids and diamines be carried out under increased pressure and raised temperature, in which process a step-by-step relaxing of the steam pressure is intended. The relaxation of pressure is accomplished in a heated tube of increasing diameter. The tube, widening at definite stages, offers the polycondensate melt running through it so much resistance that the reduction in pressure results gradually. Here, a continuous manner of operation is possible, but elaborate regulating devices are necessary. It has, further, been proposed that the polycondensation of amino carboxylic acids be conducted in the presence of an inert solvent. The starting product is here mixed with about the same quantity of, say, phenols, and this mixture is subjected to polycondensing temperatures. Polycondensates are thus obtained, which still contain a large percentage of the solvent employed, which must be removed from the polycondensate either by distillation or by extraction. This process cannot be carried out continuously.

In accordance with our invention, we have found that a continuous production of linear polyamides of dicarboxylic acids and diamines is successfully accomplished if aqueous solutions of the starting compounds are heated to polyamide-forming temperatures in phenol or its homologs, especially cresol, the concentration of which at 10 to 80%, preferably 20 to 60%, with reference to the water-free starting compound, is constantly maintained. As dicarboxylic acids and diamines, adipic acid and hexamethylene diamine, as well as their corresponding homologs can be used. In order to obtain a polyamide of a particular degree of condensation, acid or basic stabilizers are here used in a familiar manner.

In our process, aqueous solution of the starting material is vaporized, if necessary, first in a vaporizer in which part of the water is vaporized at normal pressure; then it is pumped into a vertical, heated reaction vessel. The reaction vessel can, advantageously, have a cylindrical form. The aqueous solution is conducted continuously from the top downwards, so that the condensate can form in the course of a retention period of a number of hours, and it is continuously removed from the reaction tube at the lower part by means of a pump. The reaction tube is heated to from 200 to 300° C. In the reaction tube, besides water, there is also, as a further solvent, a phenol or a corresponding homologous substance, which remains in the reaction chamber in such quantity that, because of the presence of this solvent, the melting point of the starting materials is reduced to a certain extent. The melting point should, namely, lie below the boiling point of the mixture. These conditions are fulfilled, if the quantity of phenol or cresol in the reaction tube shows a concentration of 10 to 80%, preferably from 20 to 60%, with reference to the weight of the water-free starting material. Because of the difficulty of dissolving the starting products in phenols, actually several times the amount of phenol, with reference to the starting product, would be necessary in order to maintain a solution. According to the invention, however, aqueous solutions of the salts of dicarboxylic acids and diamines are used, so that the proportion of phenol can be considerably lowered. With the employment of phenol or cresol, the boiling point lies so far below the condensation temperature of the polyamide that in the reaction chamber the phenol or cresol from the lower part, in which the completely condensed polyamide melt is situated, distills off into the upper regions of the reaction tube. On the other hand, the water introduced into the reaction tube as a solvent is distilled off at the upper end of the tube by way of a column, which is so adjusted that the phenol or cresol of high boiling point cannot distill off, and, therefore, remains in the reaction chamber. Nevertheless, certain losses of phenol or cresol will occur, which will reduce their concentration. The losses can occur through the fact that a small proportion of the phenol forms an azeotropic mixture with water and is distilled over along with it, or indeed, through the fact that the fully condensed polycondensate still contains a small percentage of phenol or cresol. These losses must be continuously balanced by replacing in the aqueous solution of the starting material conducted into the reaction tube an amount approximately equal to the total loss of phenol or cresol, which is easily ascertainable in the course of a reaction. In this manner it is possible to maintain the concentration of the phenol or cresol in the continuously fed reaction tube at the desired level.

Two considerable advantages are present in our process. First, it is possible to work at or near atmospheric pressure without separation of the starting products in the reaction tube—such as appear in simple heating of aqueous solutions at polyamide-forming temperatures, and which would considerably disturb the heat transfer in the tube until the process is interrupted. A further advantage lies in the prevention of the distilling off of the volatile parts of the starting material with steam, as, for instance, of the diamine. Whereas, therefore, it was hitherto necessary to carry out the condensation under pressure and discontinuously, so that the volatile components would not distill off during the reaction, it is, by our invention, now possible to perform the reaction at or near atmospheric pressure.

The polycondensate obtained from the reaction tube continuously by means of a pump can either be conducted directly to a spinning apparatus or can be poured out into a flat ribbon form. The polyamide still contains about 3% of phenol or its homologs, from which it can be freed in a simple manner. It is possible to cut the polycondensate present in ribbon form into small pieces and to extract these pieces with, say, water. It is, however, also possible to spin the polycondensate directly and to wash the spun product on spools in a familiar manner with water and the application either of pressure or vacuum. The removal of the phenol or cresol can also be accomplished by conducting the polycondensate in a molten state into superheated steam, so that the melt is freed from the phenol in question. The polyamides obtained are used for the production of threads, fibers, foil or objects of other forms.

It will be seen from the foregoing that the organic solvent employed should have the following qualities. It should be inert to the reactants under condensation conditions; should have a boiling point under reaction pressure above that of water at least sufficient to minimize boiling off of the organic solvent with water in the upper zone of the reaction tube, e.g., at least about 25° C. above that of water; should have a boiling point at reaction pressure below the maximum polycondensation temperature in the bottom zone of the tube; should have a boiling point at reaction pressure above the melting point of the reactants in the intermediate zone of the tube; and, finally, should exhibit little or no tendency to form an azeotropic boiling mixture with water—certainly not greater than 50% of the azeotropic mixture and preferably not greater than 20%.

The monophenols, phenol with an atmospheric boiling point of about 180° C. and the cresols with atmospheric boiling points in the approximate range of 180° C.–202° C., are eminently suitable solvents for our process. Xylenols with atmospheric boiling points in the approximate range of 211° C.–225° C. may be employed in processes operating at the higher temperatures. Other organic solvents having the above qualities may also be employed in our process.

The invention will be further understood from the following example.

*Example*

A preheated, vertically standing tube with the dimensions 6,000 mm. length and 100 mm. diameter is first filled gradually with 40 liters of a preheated, aqueous, phenol-compounded solution of the salt of adipic acid and hexamethylene diamine. The composition of the solution is as follows: 50% salt of adipic acid and hexamethylene diamine, 34% water, 16% phenol. In the lower part the reaction tube is gradually raised to a temperature of 275° C. so that the condensation begins under vaporization of water. After the equilibrium of the condensation has become established, it is possible to begin the continuous feeding and the withdrawal of the finished polycondensate.

Into the reaction tube, which is heated to 275° C. by liquid heating, a solution of the salt of adipic acid and hexamethylene diamine is introduced hourly with the aid of a regulated pump. The solution to be added every hour consists of 12 kg. of salt, 8 liters of water and 2.1 kg. of phenol. The evaporating water escapes through a column 700 mm. long, filled with packing material, mounted at the head of the reaction tube, in which process about 9% of the phenol also escapes. The water distilled off can again be used for the initiation of a new solution. If this procedure is followed, a concentration of 28 to 29% of phenol, with reference to the water-free starting material, is maintained in the upper condensation zones of the reaction tube. Any losses of phenol that can be ascertained during the course of the reaction are compensated by the addition of the same quantity of phenol, so that the given phenol concentration is essentially maintained. The concentration of phenol decreases gradually downwards in the reaction tube, because the phenol, on account of the relatively high temperatures, is distilled in the upper region, so that the condensed melt emerging at the lower end of the reaction tube contains 2 to 3% of phenol. The melt is pressed into the form of thin ribbons in water, and the cooled melt is cut into small pieces. By repeated treatment in boiling distilled water, the polycondensate is completely freed of phenol. The cut pieces are conveyed to a drier and are thereupon processed into threads by the molten-spinning process.

The invention is hereby claimed as follows:

1. A continuous process for the production of polyamides in a vertical reaction tube which comprises feeding an alkylene diamine and an aliphatic dicarboxylic acid in aqueous solution into an upper zone in said vertical reaction tube which is maintained at substantially atmospheric pressure, initiating condensation of said dicarboxylic acid and said diamine by passing them downwardly from said upper zone into and through an intermediate zone in said vertical tube, said intermediate zone being a liquid body of an inert, organic solvent for the condensate of said dicarboxylic acid and said diamine formed in said intermediate zone, said solvent having an atmospheric boiling point at least 25° C. above the boiling point of water with the further proviso that the boiling point of said solvent at about atmospheric pressure is above the melting point of the diamine-dicarboxylic acid condensate in said intermediate zone and below the maximum polycondensation temperature in said tube, said solvent further characterized by the fact that it forms azeotropic boiling mixtures with water in amounts of said solvent not higher than 50% of said azeotropic mixture, maintaining the temperature in said upper zone at the boiling point of the liquid phase in said upper zone and distilling off from said upper zone the water introduced into said upper zone by the aqueous solution of said dicarboxylic acid and said diamine, maintaining the temperature in said intermediate zone above said temperature in said upper zone but below the boiling point of said solvent in said intermediate zone at said substantially atmospheric pressure, whereby said solvent in said intermediate zone is in the liquid state and the liquid solvent in said intermediate zone and the liquid aqueous phase in said upper zone are stratified in said vertical reaction tube to form said upper and intermediate zones, completing the polycondensation of said dicarboxylic acid and said diamine by passing the condensate formed in said intermediate zone from said intermediate zone into a bottom zone in said vertical reaction tube, said bottom zone being maintained at a polycondensing temperature which is between 200° C. and 300° C. and above the boiling point of said solvent at said substantially atmospheric pressure, thereby distilling off from the polyamide in said bottom zone and into the liquid solvent body in said intermediate zone substantially all of said organic solvent, condensing the distilled vapors of said solvent in the cooler upper parts of said tube, whereby said distillation causes stratification in said vertical reaction tube of the liquid solvent of said intermediate zone and the polyamide melt of said bottom zone, which melt remains upon distillation of said solvent from the polyamide of said bottom zone, and withdrawing from said bottom zone the condensed polyamide as a melt containing a small proportion of said solvent.

2. The process of claim 1 wherein said alkylene diamine and said aliphatic carboxylic acid are fed into said upper zone in the form of the salt of said alkylene diamine and said dicarboxylic acid.

3. A continuous process for the production of polyamides in a vertical reaction tube which comprises feeding an alkylene diamine and an alphatic dicarboxylic acid in aqueous solution into an upper zone in said vertical reaction tube which is maintained at substantially atmospheric pressure, initiating condensation of said dicarboxylic acid and said diamine by passing them downwardly from said upper zone into and through an intermediate zone in said vertical tube, said intermediate zone being a liquid body of a phenol having an atmospheric boiling point in the range of about 180° C. to 225° C., said phenol being a solvent for the condensate of said dicarboxylic acid and said diamine, formed in said intermediate zone, maintaining the temperature in said upper zone at the boiling point of the liquid phase in said upper zone and distilling off from said upper zone the water introduced into said upper zone by the aqueous solution of said dicarboxylic acid and said diamine, maintaining the temperature in said intermediate zone above said temperature in said upper zone but below the boiling point of said phenol in said intermediate zone at said substantially atmospheric pressure, whereby said phenol in said intermediate zone is in the liquid state and the liquid phenol in said intermediate zone and the liquid aqueous phase in said upper zone are stratified in said vertical reaction tube to form said upper and intermediate zones, completing the polycondensation of said dicarboxylic acid and said diamine by passing the condensate formed in said intermediate zone from said intermediate zone into a bottom zone in said vertical reaction tube, said bottom zone being maintained at a polycondensing temperature which is between 200° C. and 300° C. and above the boiling point of said phenol at said substantially atmospheric pressure, thereby distilling off from the polyamide in said bottom zone and into the liquid phenol body in said intermediate zone substantially all of said organic phenol, condensing the distilled vapors of said phenol in the cooler upper parts of said tube, whereby said distillation causes stratification in said vertical reaction tube of the liquid phenol of said intermediate zone and the polyamide melt of said bottom zone, which melt remains upon distillation of said phenol from the polyamide of said bottom zone, and withdrawing from said bottom zone the condensed polyamide as a melt containing a small proportion of said phenol.

4. The process of claim 3 wherein the aliphatic dicarboxylic acid and the alkylene diamine in aqueous solution which is fed to said upper zone is an aqueous solution of the salt of hexamethylene diamine and adipic acid.

5. The process of claim 4 wherein said phenol is phenol.

6. The process of claim 4 wherein said phenol is cresol.

References Cited in the file of this patent

UNITED STATES PATENTS

| | | |
|---|---|---|
| 2,190,770 | Carothers | Feb. 20, 1940 |
| 2,639,278 | Stott et al. | May 19, 1953 |

FOREIGN PATENTS

| | | |
|---|---|---|
| 526,488 | Belgium | Feb. 27, 1954 |
| 905,317 | Germany | Mar. 1, 1954 |

OTHER REFERENCES

Textile Research Institute, Synthetic Fiber Developments in Germany (1946), pages 465, 466, 468.